United States Patent [19]

Parham, Jr.

[11] Patent Number: 4,516,453
[45] Date of Patent: May 14, 1985

[54] CONTROL AND GUIDANCE APPARATUS FOR USE WITH POWERED TOOLS

[76] Inventor: Walter J. Parham, Jr., Rte. #16, Box 20, Milton, Fla. 32570

[21] Appl. No.: 653,318

[22] Filed: Sep. 24, 1984

[51] Int. Cl.$^3$ ............................ B27B 5/20; B27B 9/04
[52] U.S. Cl. ..................................... 83/471.3; 83/473; 83/486.1; 83/488; 83/574
[58] Field of Search ..................... 83/471.2, 574, 471.3, 83/473, 486.1, 488, 522

[56] References Cited

U.S. PATENT DOCUMENTS

| | | | |
|---|---|---|---|
| 2,770,265 | 11/1956 | Pollock | 83/522 |
| 2,803,271 | 8/1957 | Shaw | 83/522 |
| 2,903,026 | 9/1959 | Frydenlund | 83/574 X |
| 2,911,017 | 11/1959 | Holder | 83/574 |
| 3,130,758 | 4/1964 | McKinley | 83/574 |
| 3,866,496 | 2/1975 | Payne et al. | 83/471.3 |

Primary Examiner—Donald R. Schran
Attorney, Agent, or Firm—Bode & Smith

[57] ABSTRACT

A control and guidance apparatus for use with a powered saw comprising a pair of parallel elongated rail members telescopically adjustable for defining a cutting path for said saw, a carriage supporting said saw and slidably mounted on the rail members for independent movement therealong and with a saw mount opening in the surface of the carriage, a third elongated rail member substantially parallel to the pair of elongated rail members, guide members mounted to the distal end of each of the parallel elongated rail members for slidably engaging the third elongated rail member, and a cord member connected to the distal end of each of the pair of elongated rail members and provided through a series of pulleys and wound about a spool for imparting arcuate movement to the pair of elongated rail members whereby the pair of elongated members telescopically lengthen as a function of the rotation of the spool.

4 Claims, 8 Drawing Figures

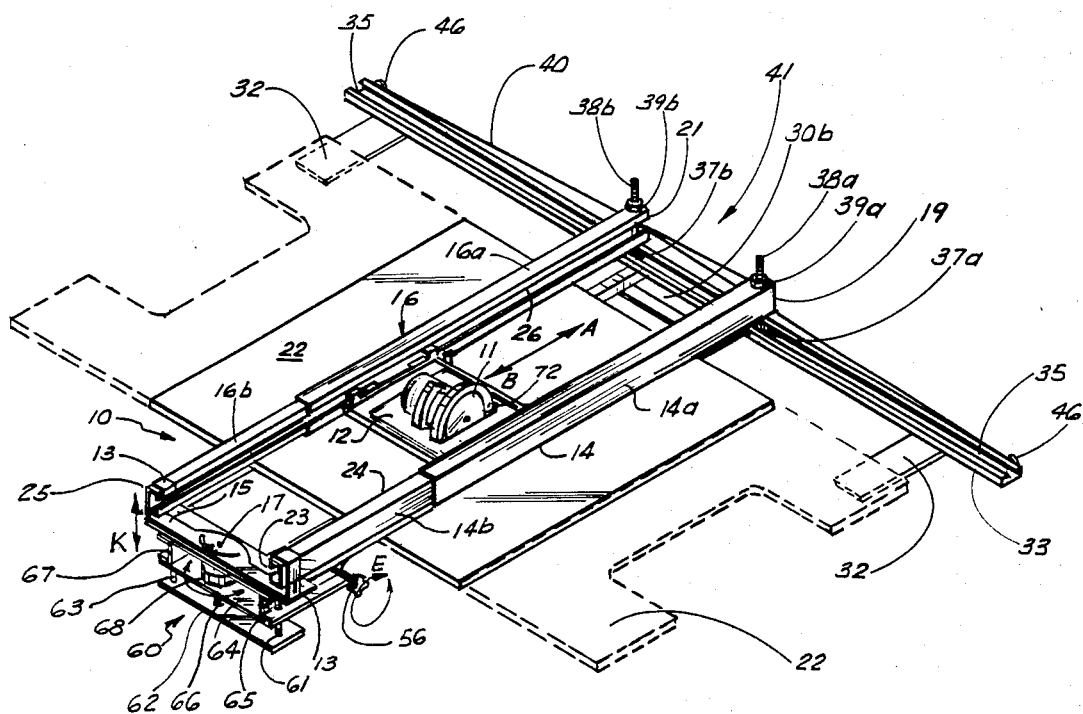
FIG. 1
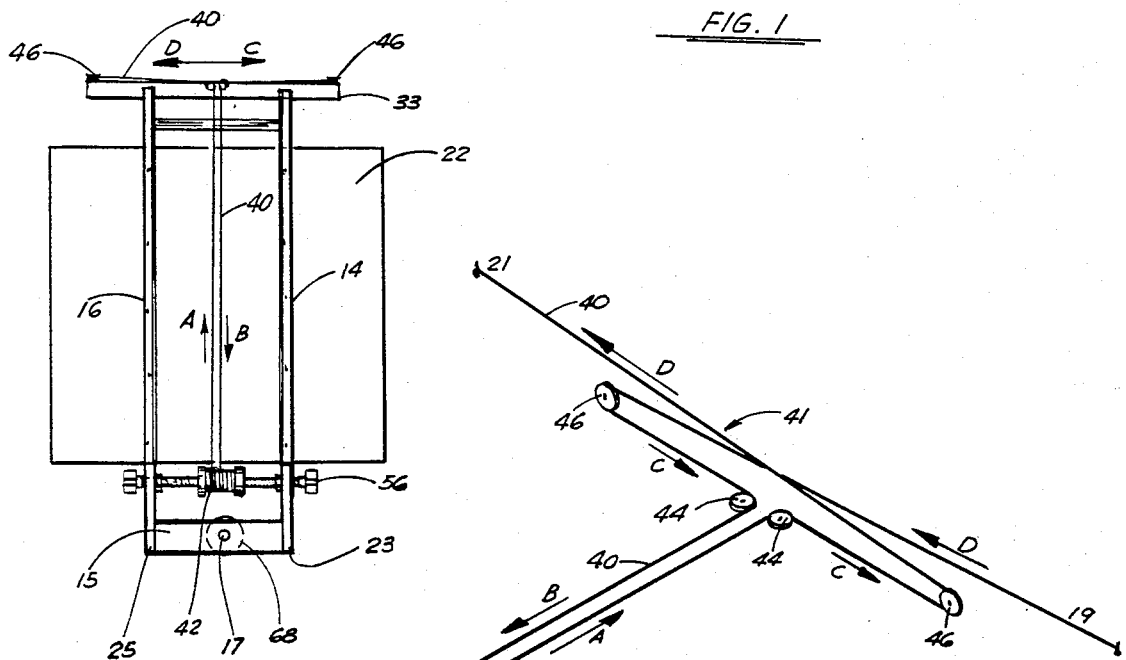
FIG. 2
FIG. 3

CONTROL AND GUIDANCE APPARATUS FOR USE WITH POWERED TOOLS

BACKGROUND OF THE INVENTION

1. Field of the Invention

The present invention relates to an adjustable apparatus for guiding a powered tool, particularly a powered saw for making cuts in a workpiece. Even more particularly, the present invention relates to a control and guidance apparatus for use with a powered saw having an adjustable means for controlling the angle of cut in the workpiece including a cord member connected to the end of each of a pair of parallel elongated rail members which are telescopically adjustable, the cord member being provided through a series of pulleys and wound about a spool for imparting rotational movement to the rail members.

2. General Background

Various devices are known which attempt to provide a guide which can be used to guide a powered hand saw in cutting an infinite variety of angles in various sizes of lumber and the like.

U.S. Pat. No. 3,983,776, issued to R. D. Flanders and entitled "Power Tool Track" discloses a means for guiding a circular saw on a predetermined path for making a straight line or angular cuts. Means for maintaining guide means 20 in proper alignment with respect to the longitudinal axis of the base are provided.

U.S. Pat. No. 3,373,781, entitled "Guide For Portable Saws," issued to S. Grosswald, and discloses a portable saw guide mechanism having a pair of rail members straddling a slot for supporting a power saw assembly.

U.S. Pat. No. 3,389,724, issued to B. M. Paul, is entitled "Saw Guide," and discloses an apparatus having a pair of saw guiding plates which are vertically spaced apart for receiving the piece to be worked therebetween and guide means for receiving a support on which is mounted a portable saw for cutting the workpiece.

U.S. Pat. No. 4,281,572, entitled "Saw Guide For Angle Cuts," issued to M. S. Stoval, and discloses a saw guide which can be removably fastened to a workpiece for guiding a cut made by a powered saw as the saw is guided by rail members. The angular position of the rails can be adjusted by the movement of arms provided at opposite ends of the piece to be worked.

Many of these devices suffer in that they provide for the guiding of a saw at a predetermined angle rather than allowing the continuous adjustment of the angle to be cut. Other devices which attempt to provide a saw guide means suffer in that they can be set at only one angle through a series of clamps and the like and not be adjusted easily and continuously for variations in working conditions.

SUMMARY OF THE PRESENT INVENTION

The present invention provides an apparatus to continually control the angle of cut in a workpiece when using a powdered saw.

The apparatus of the present invention provides a control and guidance apparatus for use with a powered saw for making controlled cuts at an infinite number of angles having a pair of elongated rail members telescopically adjustable for defining a cutting path for the saw. The elongated rail members are each comprised of telescopically mating elements so that the length of the rail members is adjustable.

The control and guidance apparatus of the present invention further has a carriage slidably mounted on the rail members for independent movement of the carriage along the rail members and with a saw mount opening in the surface of the carriage.

The control and guidance apparatus of the present invention further has adjustable means for controlling the angle of cut in the workpiece including an additional third elongated rail, means mounted to one end of the pair of elongated rail members for slidably engaging the third rail member, and a cord member connected to the distal end of each of the pair of elongated rail members and provided through a series of pulleys and wound about a spool for imparting lateral movement to the pair of elongated rail members whereby the pair of rail members telescopically elongate a length depending upon the extent of rotational movement of the spool.

The apparatus of the present invention further has an adjustable means for leveling the elongated rail members, and thus the saw carriage.

It is therefore a principal object of the present invention to provide a novel portable control and guidance apparatus for use with powered tools and in particular powered saws which combines adjustability, versatility and low cost.

It is a further object of the present invention to provide the apparatus of the present invention which is capable of making straight or angular cuts and continuously varying the angle of cut.

It is a further object of the present invention to provide a device which is capable of working in a small space, is easily moved from place to place, is readily storable, performs well in a minimum work area and requires a minimal set-up time.

Finally, it is a further object of the present invention to provide the above objects in a device which can be used in the home or commercially.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 1 is a perspective view of the preferred embodiment of the apparatus of the present invention supported on a workpiece.

FIG. 2 is a plan view of the apparatus of FIG. 1 without its saw carriage.

FIG. 3 is a perspective view of the cord, pulley and spool components of the angle of cut control means of the apparatus of FIG. 1.

DETAILED DESCRIPTION OF THE PREFERRED EMBODIMENT

Figure 4:
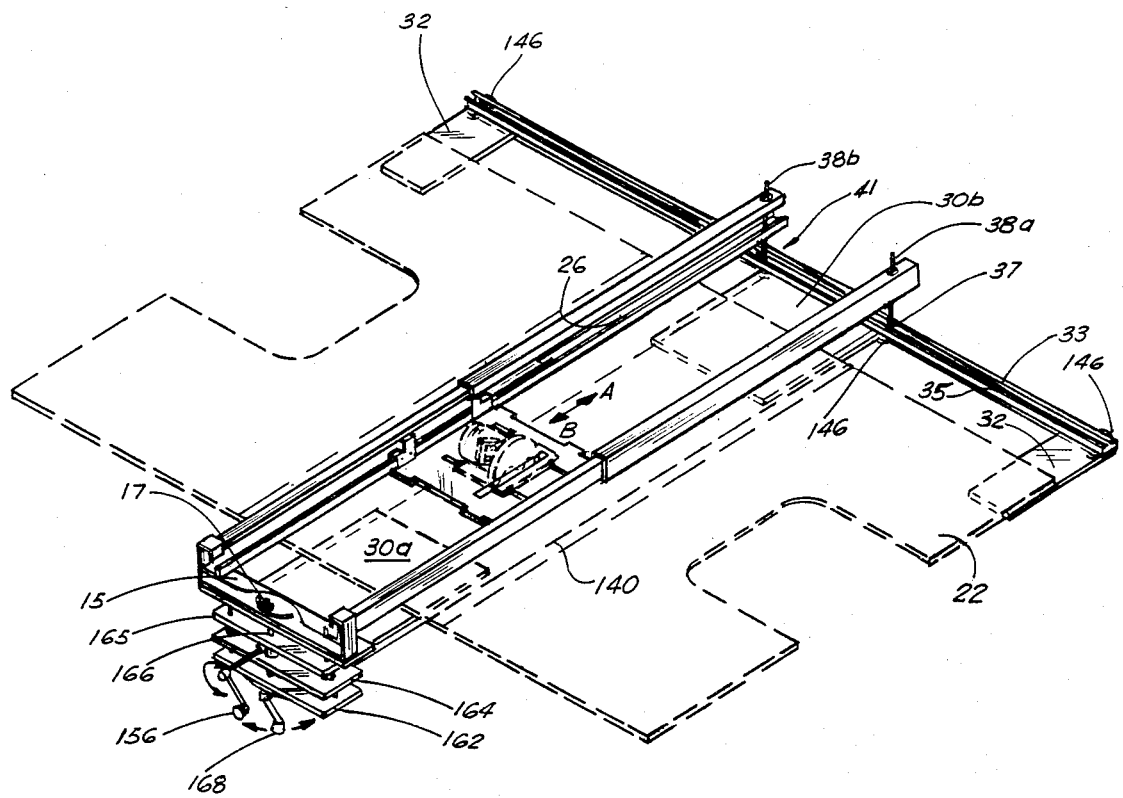
FIG. 4 is a perspective view of an alternate embodiment of the apparatus of the present invention supported on a workpiece.

FIGS. 1–3 best show the preferred embodiment of the apparatus of the present invention generally designated by the numeral 10. Apparatus 10 is comprised of a pair of longitudinally extending rail members 14, 16 each further comprised of telescopically mating members 14a, 14b, and 16a, 16b respectively thus allowing rail members 14, 16 to be adjusted in length for operational purposes to be described further herein. Rail members 14, 16 are rigidly connected at one end thereof by end plate 15. Thus any rotational (or lateral) movement of either rail member 14 or 16 will cause the same lateral or rotational movement of the other rail member as end plate 15 ensures that a parallel elongated relationship constantly exists between members 14, 16. It will be easily understood, once the apparatus 10 is described in further detail herein, that rail members 14, 16 will move through an arcuate path about pivot point 17, best seen in FIG. 2 (in the preferred embodiment) and FIG. 5 (in the alternate embodiment).

Figure 6:
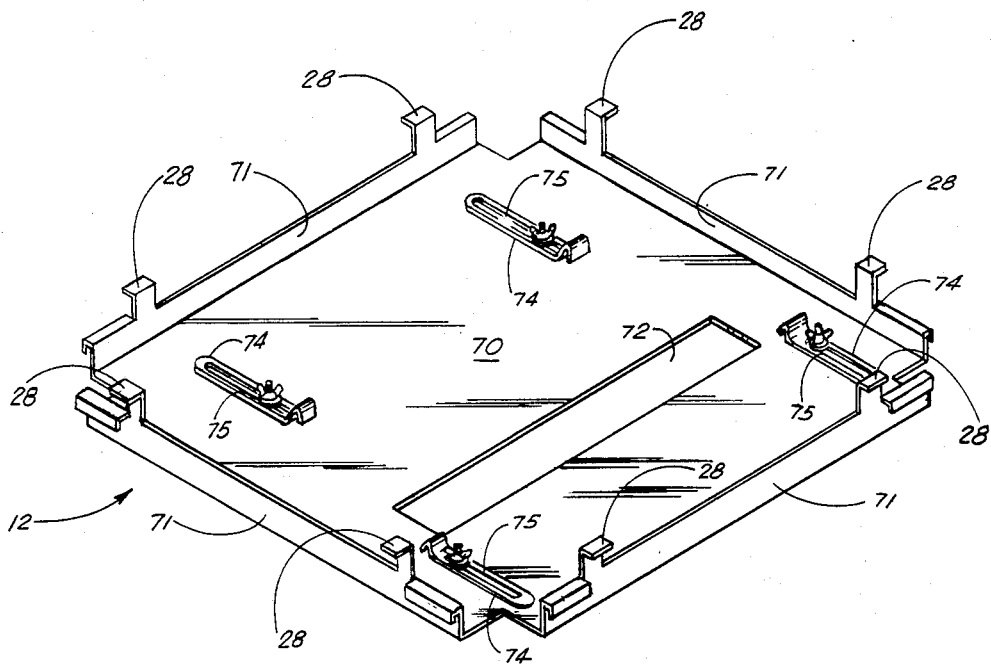
FIG. 6 is a perspective view of the saw carriage of the apparatus of FIGS. 1 and 4.

Returning now to FIGS. 1–3, a carriage or saw support member 12 is slidably mounted on rail members 14, 16 and provides for independent movement of carriage 12 therealong. As best seen in FIG. 6, carriage 12 is provided with a surface 70 and flanged to form side flange portions 71. Each of side flange portions 71 are further provided with a pair of outwardly projecting tongue members 28 which engage channels 24, 26, provided in the interior sides of rails 14, 16 respectively. The engagement of tongues 28 in channels 24, 26 prevent carriage 12 from "kicking out" or dislodging from apparatus 10 during cutting operations. Carriage 12 is further provided with opening 72 in surface 70 where hand-powered saw 11 or other conventional powered tool can be mounted for cutting or other operations. For further description of the present invention, power saw 11 will be illustrative of power tools generally. Further, carriage 12 is provided with adjustable fastening means 74 provided in surface 70 for securing saw 11 to surface 70 of carriage 12. Slots 75 allow fastening means 74 to be adjustable. Thus, it can be readily understood that when saw 11 is mounted in carriage 12 and carriage 12 is mounted on rails 14, 16 by the engagement of tongues 28 in channels 24, 26, carriage 12 and thus saw 11 can move therealong in the directions of ARROWS A and B to effectuate the cutting of a workpiece 22 of desired length and width (as illustrated by the phantom extensions of workpiece 22 in FIGS. 1 and 4).

Figure 5:
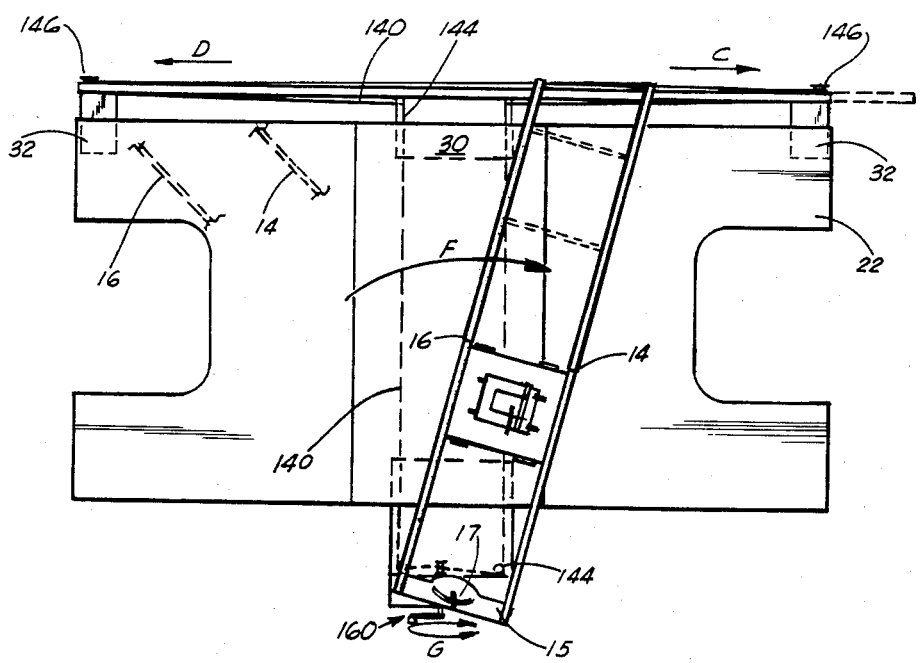
FIG. 5 is a plan view of the apparatus of FIG. 4 adjusted for a predetermined angle of cut of approximately 10° (for illustration purposes only).

Apparatus 10 is stabilized by providing workpiece 22 and a plurality of adjustable clamps 30, 32, best seen in FIGS. 4 and 5, which secure apparatus 10 to workpiece 22.

With elongated rail members 14, 16 fixed in parallel relation and movable only about point 17, it is understandable that apparatus 10 can be moved through an infinite number of angles in the direction of or counter to ARROW F and thus provide an angulated cut in workpiece 22. However, so can the apparatus of the prior art, and, therefore, the apparatus of the present invention 10 provides a means to control this angle of cut allowing for minute continuous adjustment. Adjustable means for controlling the angle of cut in workpiece 22 is best shown in FIGS. 1, 3 and 4 comprises a third channelized elongated rail member 33 having a channel 35 provided therein. Rail member 33 is orientated substantially perpendicular to rail members 14, 16 and with channel means 35 orientated upwardly and exposed to the under side of the distal ends 19, 21 respectively of each of rail members 14, 16. Each of rail members 14, 16 have provided through its distal end 19, 21 respectively a means 38, taking the form of a conventional bolt in the preferred embodiment, which extends through the lowermost portion of rails 14, 16 for engaging channel 35 of rail 33. The lowermost portion of means or bolt 38 is provided with a protrusion or knob 37 which would take the form of a conventional nut to ensure the movement of bolts 38 and thus the distal ends 19, 21 of rails 14, 16 only horizontally or transversely along rail 33. Bolts 38 are further provided with additional nuts 39a, 39b and 39c, 39d (not shown on bolts 38a, 38b) with channels 24, 26 to rigidly affix rails 14, 16 thereto.

Thus in operation, the movement of either of bolts 38 or rails 14, 16 at their distal ends 19, 21, can only take place along the lateral channel 35 of rail 33. It can be readily appreciated therefore, that there is the need for the telescoping nature of rails 14, 16 in that the lateral movement of bolts 38 at the distal ends 19, 21 of rails 14, 16 in the direction of ARROWS C or D, as illustrated in FIG. 5 (illustrating movement in direction of ARROW C), will cause apparatus 10 to pivot about point 17 causing rotation or arcuate movement of apparatus 10 in direction of ARROW F illustrated in FIG. 5, and the movement of the distal ends 19, 21 of rails 14, 16 in continued parallel relationship. This parallel relationship of rails 14, 16 requires that in the angulated position of FIG. 5, or any other angulated position, one rail (rail 16 in the position of FIG. 5) be longer than its companion rail (rail 14 in FIG. 5). This is accomplished by the telescoping nature of rail elements 14a, 14b and 16a, 16b as member 14a has disengaged from a greater part of element 14b then corresponding element 16a has of element 16b. Of course rail 16 has had to elongate also to accomplish the position of FIG. 5, although not as much as that of rail 14.

To remotely control the movement of the distal ends 19, 21 of rails 14, 16 and thus the movement of bolts 38 in channel 35 of rail 33 means 41 further comprises a cord member 40 connected to the distal ends 19 and 21 of rails 14, 16 by being hinged or "outriggered" thereto, as illustrated in FIG. 3. This securing of the ends of cord 40 to the distal end of rails 14, 16 can take several other variant forms, one of which would be to hinge or tie cord 40 to bolts 38 or the like.

Cord 40 controls the movement of rails 14, 16 and guide means or bolts 38 in channel 35 in rail 33 by providing cord 40 through a series of pulleys 44, 46 (and possible others not shown) and winding it about spool 42 provided at the proximate end of apparatus 10. In the preferred embodiment spool 42 is provided with shaft 54 and end disks 52 for confining cord 40 to shaft 54 once it is wound upon spool 42. Knobs 56 are provided to allow gripping and rotation of spool 42. Pulleys 46 are mounted to apparatus 10 at each end of rail member 33 as illustrated in FIGS. 1–5 and pulley 44 to rail member 33 at intermediate locations thereof.

With sufficient tension in cord 40, the rotation of spool 42 in the direction of ARROW E, as illustrated in FIG. 3, will impart movement of cord 40 in the direction of ARROWS A, B, and D as therein illustrated. Imagine one end of cord 40 attached to an outrigger at bolt 38a—the rotation of spool 42 in the direction of ARROW E will impart movement to the distal end 19 of rail 14 and thus impart movement to guide means or bolt 38a in the direction of ARROW D, and correspondingly impart movement to the distal end 21 of rail 16 and bolt or guide means 38b in the direction of ARROW D, thus allowing it to assume a position which would be the mirror image of FIG. 5. Correspondingly, movement of spool 42 in the direction opposite that of ARROW E of FIG. 3, will impart movement opposite the direction of the ARROWS illustrated therein, and cause apparatus 10 to assume a position approximating that of FIG. 5 when moved through an angle of approximately 10°. Once a desired position of apparatus 10 is reached; a conventional ratchet locking means such as a reversible pawl or the like (not shown) on spool 42 can be engaged to prevent movement of spool 42 and thus prevent movement of apparatus 10 from the desired position. A temporary release of the engaging mechanism of the lock (not shown) allows minute adjustments of apparatus 10 to the desired angle.

Apparatus 10 is further provided with adjustable means 60 for controlling the elevation thereof by allowing for vertical movement of the proximate ends 23, 25 of rail members 14, 16 (and end plate 15) relative to the distal ends 19, 21 thereof. As best seen in the preferred embodiment of FIGS. 1 and 2, means 60 for controlling the elevation is provided by a pair of horizontally disposed plates 62, 64 provided spaced below and parallel to end plate 15. The lowermost plate 62 has fixedly secured at each end thereof and depending upwardly therefrom, posts 61, 63 which pass through apertures in the end of intermediate plate 64 provided between plate 62 and end plate 15. Posts 65, 67 are similarly fixedly secured to the underside of end plate 15 and therefore, rod members or posts 61, 63 telescopically mate into post members 65, 67. There is provided intermediate plates 62, 64 and 15 vertically extending threaded member 66 which fixedly engages and depends downwardly from end plate 15 and upwardly from plate 62 and passes through an aperture intermediate plate 64. There is further provided a threading means 68 which allows through its rotational movement the movement of end plate 15 upwardly or downwardly in relation to end plate 62 which has clamp 30a fixedly secured thereto thus allowing for the leveling of apparatus 10 as the proximate ends 23, 25 are moved into elevational alignment with the distal ends 19, 21. This elevation can of course be verified by conventional use of devices such as a conventional "level."

Figure 7:
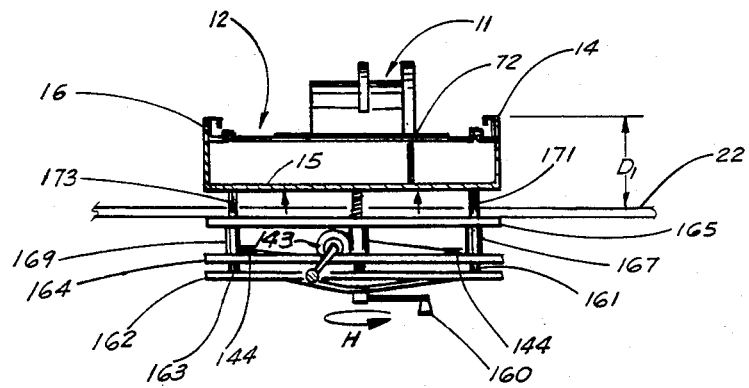
FIG. 7 is an end view of the apparatus of FIG. 4.
Figure 8:
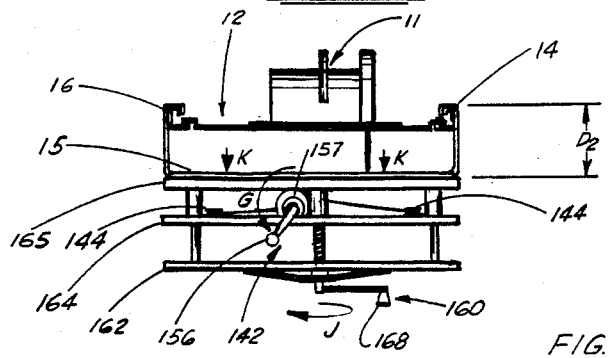
FIG. 8 is an end view of the apparatus of FIG. 4 with the elevation of the proximate end of the apparatus altered from that of FIG. 7.

FIGS. 4, 5, 7 and 8 illustrate the alternate embodiment of both the means for controlling the angle of cut and means for controlling the elevation. As illustrated in FIGS. 7 and 8, means 156 provided with a handle 157 can provide a spool 142 for securing cord 140 through a system of pulleys 144, 146. Similarly, elevation control means 160 can be provided with a handle 168 for movement in the direction of either ARROWS H or J to adjust the elevation of apparatus 10 by moving plate 165 and thus workpiece 22 relative to plate 162 fixedly positioned relative to plate 164 secured to clamp 30a (for example, the distance between carriage 12 and workpiece 22 has been reduced from D1 to D2 between FIGS. 7 and 8).

Thus in operation, when a workpiece 22 is selected and is secured to apparatus 10 through the use of clamps 30, 32, spool 42 is provided with rotational movement (either in the direction of ARROW E or opposite thereto) to impart movement to guide means 38 in channel 35 of rail 33 thus moving rails 14 and 16 to a desired position (such as that illustrated in FIG. 5). This angular orientation of rails 14, 16 will of course cause the elongation of both rails, one more than the other (rail 14 being longer than rail 16 in FIG. 5) and allow the movement of carriage 12 along channels 24, 26 of rails 14, 16 respectively to allow powered saw 11 secured in carriage 12 to perform an angled cut on workpiece 22. The angle of cut is ensured to be constant by a ratchet type locking means or suitable substitute provided on spool 42. Before a cutting operation is begun at the angle desired, elevation control means 60 can be operated to level apparatus 10 with respect to workpiece 22.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A control and guidance apparatus for use with a powered saw for making controlled cuts at an infinite number of angles in a workpiece comprising:
   a. a pair of parallel elongated rail members telescopically adjustable in length for defining a cutting path for a saw;
   b. a carriage moveably mounted on said rail members for independent movement therealong and with a saw mount opening in its surface; and
   c. adjustable means for controlling the angle of cut of said saw in said workpiece including:
      i. a third elongated rail member substantially perpendicular to said pair of elongated rail members;
      ii. means mounted to the distal end of each of said elongated rail members for slidably engaging said third elongated rail member; and
      iii. a cord means connected to the distal end of each of said pair of elongated rail members and provided through a series of pulleys and wound about a spool for imparting arcuate movement to said pair of elongated rail members whereby said pair of rail members telescopically lengthen as a function of the rotation of said spool.

2. The apparatus of claim 1 further comprising adjustable means for controlling the elevation of the proximate end of said pair of elongated rail members relative to the distal ends thereof.

3. The apparatus of claim 1 wherein said carriage includes first and second side portions with laterally protruding members for engaging channels provided in said parallel elongated rail members.

4. A control and guidance apparatus for use with a powered saw for making controlled cuts at an infinite number of angles in a workpiece comprising:
   a. a pair of parallel elongated rail members telescopically adjustable in length for defining a cutting path for a saw;
   b. a carriage with a surface supporting said saw and slidably moveable on said rail members for independent movement therealong and having first and second side portions with laterally protruding members for engaging channels provided in said parallel elongated rail members, and with a saw mount opening in its surface;
   c. adjustable means for controlling the angle of cut in said workpiece including:
      i. a third elongated rail member substantially perpendicular to said pair of elongated rail members;

ii. means mounted to the distal end of each of said pair of elongated rail members for slidably engaging said third elongated rail member;

iii. cord means connected to the distal end of each of said pair of elongated rail members and provided through a series of pulleys and wound about a spool for imparting arcuate movement to said pair of elongated rail members whereby said pair of elongated rail members telescopically lengthen as a function of the rotation of said spool; and iv. adjustable means for controlling the elevation of the proximate end of said elongated rail members relative to the fixed distal end thereof.

* * * * *